United States Patent
Iwahara et al.

(10) Patent No.: US 11,765,487 B2
(45) Date of Patent: Sep. 19, 2023

(54) IMAGING APPARATUS

(71) Applicant: CANON KABUSHIKI KAISHA, Tokyo (JP)

(72) Inventors: Tomonaga Iwahara, Kanagawa (JP); Mie Ishii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/712,992

(22) Filed: Apr. 4, 2022

(65) Prior Publication Data

US 2022/0329749 A1 Oct. 13, 2022

(30) Foreign Application Priority Data

Apr. 8, 2021 (JP) .................. 2021-065655

(51) Int. Cl.
*H04N 25/772* (2023.01)
*H04N 25/75* (2023.01)

(52) U.S. Cl.
CPC ........... *H04N 25/772* (2023.01); *H04N 25/75* (2023.01)

(58) Field of Classification Search
CPC ............................ H04N 25/772; H04N 25/75
See application file for complete search history.

(56) References Cited

U.S. PATENT DOCUMENTS

2017/0064237 A1* 3/2017 Aibara ................ H04N 25/583
2018/0027202 A1* 1/2018 Ishii ..................... H04N 3/1556
                                                                348/308

FOREIGN PATENT DOCUMENTS

JP          2016054424 A      4/2016

* cited by examiner

*Primary Examiner* — Twyler L Haskins
*Assistant Examiner* — Fayez A Bhuiyan
(74) *Attorney, Agent, or Firm* — CANON U.S.A., INC. IP Division

(57) ABSTRACT

An imaging apparatus is provided in which signals from a plurality of pixels are output to signal output lines during a predetermined reading period, a first reading mode and a second reading mode where analog-to-digital (AD) conversion circuits perform AD conversion on the signals are included, and the reading period includes a first period from when the signals from the pixels are output to the signal output lines to when the AD conversion circuits start AD conversion on the signals a predetermined time later, and a second period where the AD conversion circuits perform the AD conversion on the signals from the pixels, the reading period is equal between the first and second reading modes, and lengths of the first and second periods are different from each other.

5 Claims, 11 Drawing Sheets

FIG.5

| ISO SENSITIVITY | READING MODE | ANALOG GAIN (UNTIL AD CONVERSION) | DIGITAL GAIN (AFTER AD CONVERSION) |
|---|---|---|---|
| ISO100 – ISO3200 | 1 | x1 – x32 | x1 |
| ISO6400 | 2 | x32 | x2 |
| ISO12800 | 2 | x32 | x4 |

IMAGING APPARATUS

BACKGROUND

Field of the Disclosure

The present disclosure relates to an imaging apparatus.

Description of the Related Art

In an imaging apparatus such as a digital camera or a video camera, an image sensor such as a complementary metal-oxide-semiconductor (CMOS) image sensor is used. To increase a continuous image capturing speed or a frame rate or reduce rolling distortion, the CMOS image sensor requires the speeding up of the reading of a pixel signal. To speed up the reading of a signal, a signal reading period per row of a pixel array is shortened, or signals are simultaneously read from pixels in a plurality of rows.

Japanese Patent Application Laid-Open No. 2016-54424 discusses a technique for changing a signal reading period of an image sensor according to the International Organization for Standardization (ISO) sensitivity. For example, Japanese Patent Application Laid-Open No. 2016-54424 discusses a technique for making an analog-to-digital (AD) conversion period shorter in a case where an ISO sensitivity of 100 is set than in a case where an ISO sensitivity of 200 or higher is set, thereby achieving the speeding up of the reading of a signal and a reduction in power consumption.

If the signal reading period is shortened to speed up the reading of a signal, an offset shift in a signal level may occur in the same row as that of a high-luminance object in a captured image. Such an offset shift in a signal level is caused by the propagation of a fluctuation in the potential of a pixel due to a high-luminance object to another column in the same row that transfers a signal at the same time as a high-luminance pixel through the impedance of a power supply line or ground (GND) that are common.

The offset shift in the signal level is visually confirmed as a lateral band-like color cast that occurs in the horizontal direction, particularly in a dark portion of the image. The higher the gain applied to a pixel signal with a high ISO sensitivity is, the more conspicuous the offset shift is. To reduce this, a signal reading period per row can be extended, thereby securing time until a fluctuation in the potential is stabilized.

The extension of the stabilization period, however, results in extending the signal reading period when a signal is read from the image sensor. Thus, the speeding up of the reading of a signal cannot be achieved.

SUMMARY

An imaging apparatus includes a pixel array in which a plurality of pixels is arranged in a matrix, a plurality of column signal lines to which signals of the plurality of pixels are output with respect to each column of the pixel array, a plurality of analog-to-digital (AD) conversion circuits configured to perform AD conversion on the signals from the plurality of pixels output to the plurality of column signal lines with respect to each column, an amplification circuit configured to amplify, with digital gain, digital signals obtained by the plurality of AD conversion circuits performing the AD conversion, and a control unit configured to perform control to output signals of pixels placed in a same row of the pixel array among the plurality of pixels to the plurality of column signal lines with respect to each column and cause the plurality of AD conversion circuits to perform signal AD conversion during a predetermined reading period, and to perform control to, in a case where the amplification circuit does not amplify the digital signals, read the signals of the plurality of pixels in a first signal reading mode, and in a case where the amplification circuit amplifies the digital signals, read the signals of the plurality of pixels in a second signal reading mode, wherein the predetermined reading period includes a first period from when the signals of the plurality of pixels are output to the plurality of column signal lines with respect to each column and the plurality of AD conversion circuits starts signal AD conversion, and a second period when the plurality of AD conversion circuits performs the signal AD conversion from the plurality of pixels output to the plurality of column signal lines with respect to each column, and wherein the predetermined reading period is equal between the first and second signal reading modes, the first period in the second signal reading mode is longer than the first period in the first signal reading mode, and the second period in the second signal reading mode is shorter than the second period in the first signal reading mode.

Further features of the present invention will become apparent from the following description of exemplary embodiments with reference to the attached drawings.

BRIEF DESCRIPTION OF THE DRAWINGS

FIG. 5 is a conceptual diagram illustrating combinations of an image capturing mode, a reading operation, and signal processing according to the exemplary embodiment.

DESCRIPTION OF THE EMBODIMENTS

Exemplary embodiments of the present invention will be described in detail below based on the attached drawings.

Figure 1:
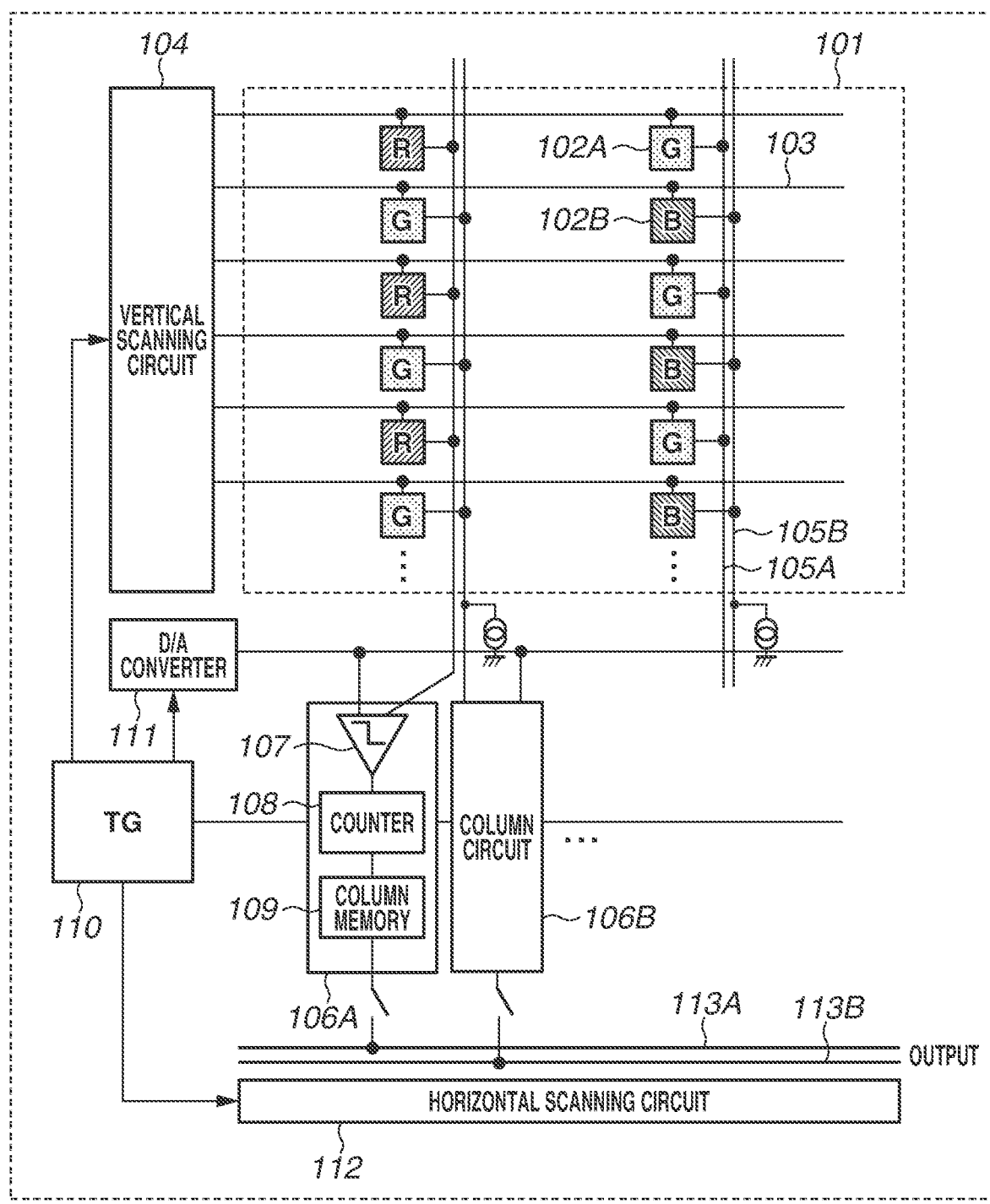
FIG. 1 is a diagram illustrating a configuration of pixels and peripheral circuits of an image sensor according to an exemplary embodiment.

FIG. 1 is a block diagram illustrating an example of the configuration of pixels and peripheral circuits of an image sensor 400 according to a first exemplary embodiment. In FIG. 1, a plurality of pixels 102 is arranged in a matrix in a pixel array 101, and color filters different in spectral transmittance are formed in the respective pixels 102. In FIG. 1, the pixels 102 are assigned letters R, G, and B, which indicates that color filters having spectral transmittances corresponding to red, green, and blue are provided in the pixels 102.

Signals of the plurality of pixels 102 are output to column signal lines with respect to each column. The present exemplary embodiment is described on the assumption that two column signal lines are provided for each column. The number of column signal lines, however, is not limited to this. Any number of column signal lines, such as 4, 12, or 20 column signal lines, may be provided according to the properties required by the image sensor 400.

Pixels 102A are connected to a column signal line 105A by a selection switch (not illustrated), and an output signal of the pixel 102A in each row is output to a column circuit 106A via the column signal line 105A. Pixels 102B are connected to a column signal line 105B by the selection switch (not illustrated), and an output signal of the pixel 102B in each row is output to a column circuit 106B via the column signal line 105B. The selection switch is used to perform control to selectively output pixel signals in a particular row based on a control signal supplied from a vertical scanning circuit 104 via a control signal line 103.

The pixels 102A arranged in (2N-1) rows (N is a natural number) thus connected to the column signal line 105A and the pixels 102B arranged in 2N rows thus connected to the column signal line 105B are arranged periodically in a matrix. The column signal lines 105A and 105B output pixel signals to the column circuits 106A and 106B, respectively, with respect to each row. The column signal lines 105A and 105B are occasionally collectively referred to as a "column signal line 105".

A timing generator (hereinafter referred to as "TG") 110 generates a pulse signal for the vertical scanning circuit 104 to control a transistor in each pixel 102 and also controls a digital-to-analog (D/A) converter (hereinafter referred to as "DAC") 111. The DAC 111 generates a comparison reference signal and a reference signal (a slope signal or a ramp signal) the level of which changes with the lapse of time, and the DAC 111 supplies the generated signals to a comparator 107. Under control of the TG 110, the comparison reference signal and the reference signal are input from the DAC 111 to one of a comparator 107 of the column circuit 106A or 106B. As will be described below, the rate of change per time in the reference signal to be supplied from the DAC 111 to the comparator 107 can be changed. The rate of change per time in the reference signal is changed, whereby it is possible to change analog gain when analog-to-digital (AD) conversion is performed.

Next, the configurations of the column circuits 106A and 106B will be described. The column circuit 106A is connected to the column signal line 105A, and the column circuit 106B is connected to the column signal line 105B. The column circuits 106A and 106B are occasionally collectively referred to as a "column circuit" 106.

Each of the column circuits 106A and 106B includes a comparator 107, a counter 108, and a column memory 109. To one of the inputs of the comparator 107, a reference signal generated by the DAC 111 is input. To the other of the inputs, an output signal of each pixel 102 is input via the column signal line 105.

The comparator 107 compares a potential V that changes according to the output signal of the pixel 102 from the column signal line 105 with the reference signal. Then, according to the relative magnitude relationship between the potential V and the reference signal, the comparator 107 outputs a binary value indicating either of a low level and a high level.

Based on a clock, the counter 108 measures the time until the relative magnitude relationship inverts. Then, the counter 108 outputs the measured time as a digital signal. The column memory 109 holds the digital signal of the time measured by the counter 108. That is, the comparator 107, the counter 108, and the column memory 109 of the column circuit 106 form an AD conversion circuit. The AD conversion circuit according to the present exemplary embodiment is a slope AD conversion circuit that performs AD conversion on signals of a plurality of pixels using a reference signal the level of which changes with the lapse of time.

Under control of the TG 110, a horizontal scanning circuit 112 scans the column circuit 106 in the column direction and turns on the selection switch. Then, by the turning on of the selection switch, digital signals of two columns corresponding to pixels 102A and 102B that are held in the column memories 109 of the column circuits 106A and 106B are simultaneously output via horizontal signal lines 113A and 113B, each connected commonly to the corresponding columns.

Figure 2:
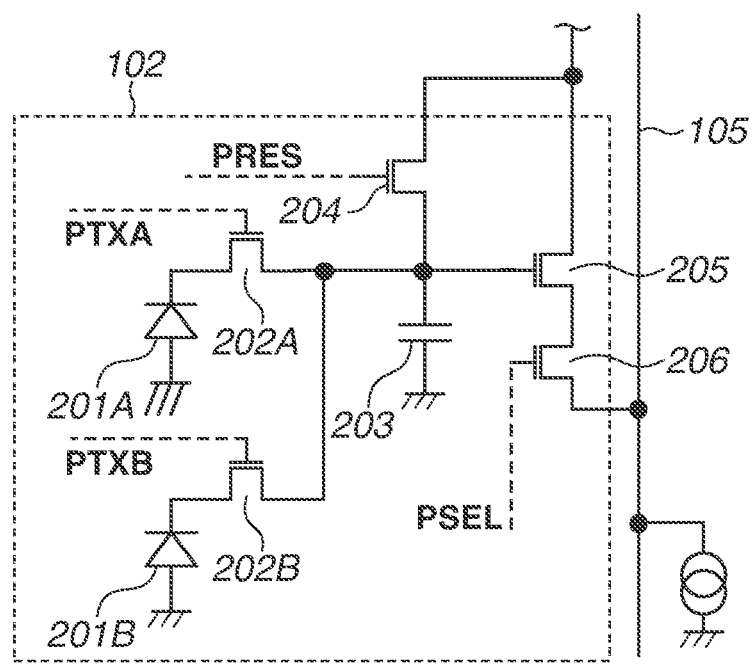
FIG. 2 is a diagram illustrating a configuration of a unit pixel in the image sensor according to the exemplary embodiment.

FIG. 2 is a circuit diagram illustrating an example of the configuration of each pixel 102. The pixel 102 includes a plurality of photodiodes (hereinafter referred to as "PDs") 201A and 201B that are photoelectric conversion units. That is, in the present exemplary embodiment, the pixel 102 has a dual pixel structure to acquire phase difference information regarding an object through an imaging lens. Alternatively, not only a dual pixel structure, but also a single pixel structure where each pixel includes a single PD may be employed.

The PDs 201A and 201B share a single microlens (not illustrated) for focus detection. In the following description, a signal based on photoelectric conversion by the PD 201A is an A signal, and a signal based on photoelectric conversion by the PD 201B is a B signal. A signal based on photoelectric conversion by both the PDs 201A and 201B is an A+B signal.

The PD 201A is connected via a transfer switch 202A, and the PD 201B is connected via a transfer switch 202B, to common floating diffusion (hereinafter referred to as "FD") 203. The transfer switch 202A is controlled by a transfer pulse PTXA supplied from the vertical scanning circuit 104, and the transfer switch 202B is controlled by a transfer pulse PTXB supplied from the vertical scanning circuit 104.

The FD 203 temporarily accumulates charges transferred from the PDs 201A and 201B and converts the charges into voltages. A reset switch 204 is controlled by a reset pulse PRES supplied form the vertical scanning circuit 104 and supplies a reference potential VDD to the FD 203, thereby resetting the FD 203.

A pixel amplifier 205 is a source follower circuit composed of a metal-oxide-semiconductor (MOS) transistor and a constant current source. A selection switch 206 is controlled by a selection pulse PSEL supplied from the vertical scanning circuit 104 and outputs a fluctuation in the potential of the pixel amplifier 205 according to the amount of accumulated charge of the FD 203 to the column signal line 105.

Figure 3:
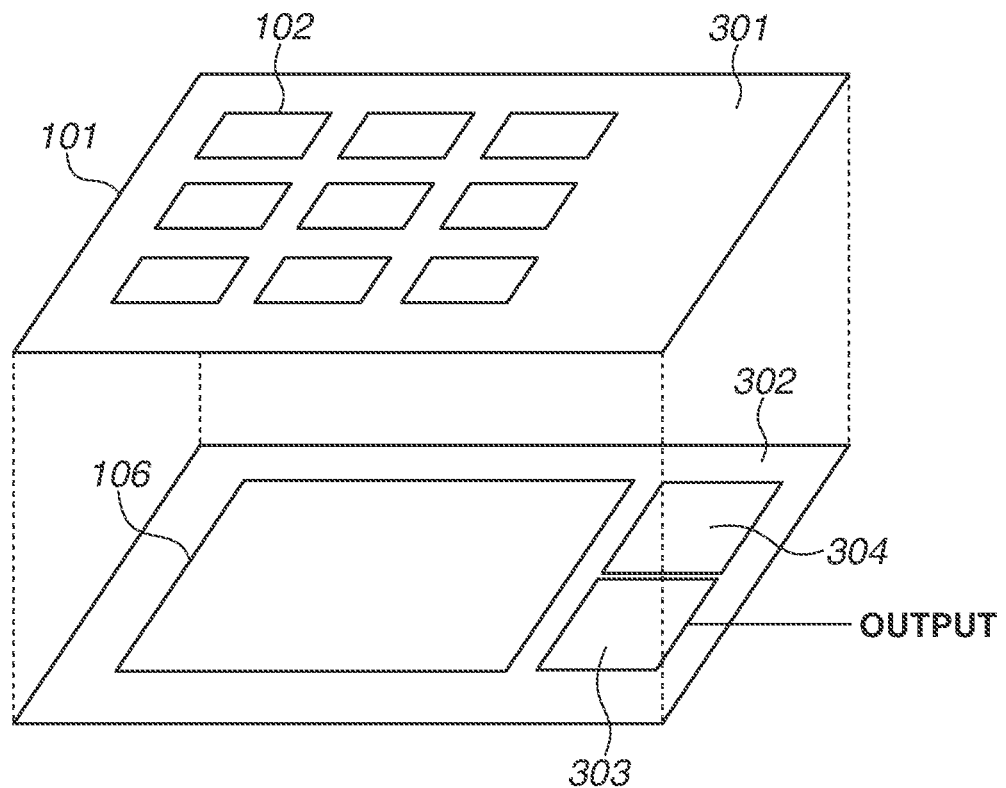
FIG. 3 is a schematic diagram illustrating a laminated structure of the image sensor according to the exemplary embodiment.

FIG. 3 is a schematic diagram illustrating the structure of the image sensor 400 according to the present exemplary embodiment. The image sensor 400 has a structure where a first semiconductor substrate 301 on which the pixel portion 101 is formed and a second semiconductor substrate 302 on which the column circuit 106 is formed are laminated on each other. The first semiconductor substrate 301 and the second semiconductor substrate 302 are electrically connected together by a bump.

The second semiconductor substrate 302 includes the column circuit 106, a data processing circuit 303, and a memory 304. The data processing circuit 303 performs various calculation processes and correction processes on an image signal output from the column circuit 106. The semiconductor substrate memory 304 is a volatile memory such as a dynamic random-access memory (DRAM) and is used for the purpose of temporarily holding image data and correction data when the data processing circuit 303 processes the image signal output from the column circuit 106. Other components of the image sensor 400 that are not illustrated in FIG. 3 may be provided on either of the semiconductor substrates 301 and 302.

Figure 4:
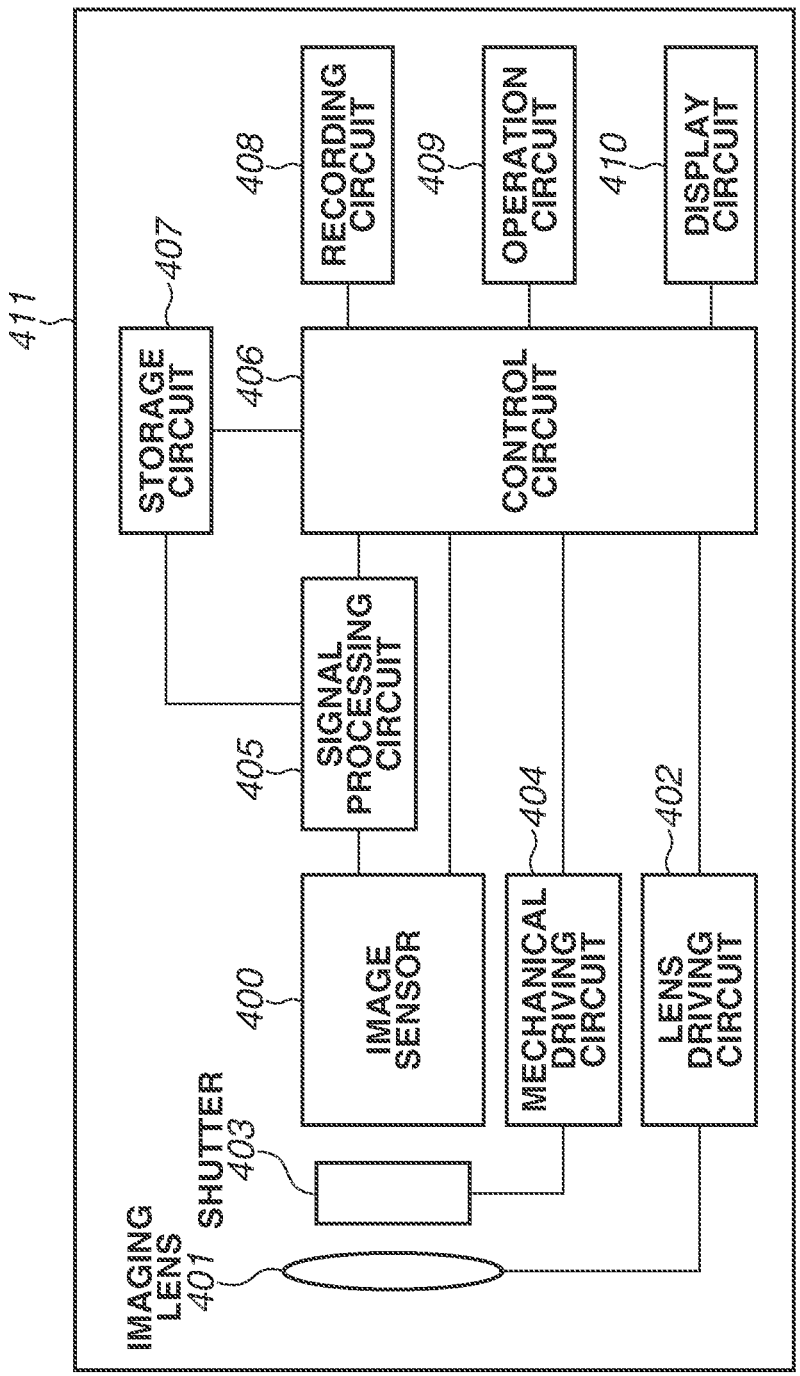
FIG. 4 is a block diagram illustrating an example of a configuration of an imaging apparatus including the image sensor according to the exemplary embodiment.

FIG. 4 is a block diagram illustrating the configuration of an imaging apparatus 411 according to the present exemplary embodiment.

In FIG. 4, the focusing of an imaging lens 401 is controlled by a lens driving circuit 402, and the imaging lens 401 forms an optical image of an object on the image sensor 400. The image sensor 400 converts incident light according to the optical image of the object into an image signal and outputs the image signal.

A shutter 403 is controlled by a mechanical driving circuit 404 and controls the amount of exposure of the image sensor 400. A signal processing circuit 405 (an amplification circuit) performs various calculation processes such as an amplification process for amplifying the image signal output from the image sensor 400 with digital gain, offset correction, and white balance correction.

A control circuit 406 controls the entirety of the imaging apparatus 411. That is, the control circuit 406 performs various processes such as calculation processes for performing driving control of the image sensor 400 and autofocus control for controlling the focal position of the imaging lens 401 by the lens driving circuit 402, and control of the shutter 403 by the mechanical driving circuit 404. The signal processing circuit 405 may be built into the control circuit 406.

A storage circuit 407 is a storage memory that holds image data and an offset correction value. The storage circuit 407 is connected to the signal processing circuit 405. Further, the storage circuit 407 may also be connected to the data processing circuit 303 of the image sensor 400 and configured to selectively communicate image data and correction data.

A recording circuit 408 records image data in a detachably attachable recording medium, such as a semiconductor memory typified by a Secure Digital (SD) card. An operation circuit 409 receives an intention and an operation of a user through a physical button, a touch panel, and various sensors. A display circuit 410 includes a backside liquid crystal display and an electronic viewfinder and displays various pieces of information regarding the imaging apparatus 411.

Next, with reference to FIG. 5, a description is given of the relationships between the International Organization for Standardization (ISO) sensitivity, which is an exposure index set for the imaging apparatus 411 according to the present exemplary embodiment, and a reading mode, analog gain, and digital gain. FIG. 5 is a diagram illustrating the relationships between the ISO sensitivity set for the imaging apparatus 411 according to the present exemplary embodiment, and the reading mode, the analog gain, and the digital gain. The analog gain is defined as an amplification factor applied to an analog signal until AD conversion is performed by the AD conversion circuit. The digital gain is defined as an amplification factor applied to a digital signal after AD conversion is performed.

According to the ISO sensitivity set by automatic exposure control or an operation of the user, the imaging apparatus 411 according to the present exemplary embodiment sets a reading mode and analog gain of the image sensor 400 and also sets digital gain of the signal processing circuit 405. The details of a first reading mode and a second reading mode set for the image sensor 400 will be described below.

First, if the ISO sensitivity is set between ISO 100 and ISO 3200, the imaging apparatus 411 sets a first reading mode for the image sensor 400. The imaging apparatus 411 also sets an analog gain of 1 time to 32 times for the image sensor 400 according to the set ISO sensitivity and sets a digital gain of 1 time for the signal processing circuit 405 regardless of the set ISO sensitivity. That is, the signal processing circuit 405 does not amplify a digital signal with digital gain. Then, the AD conversion circuit performs AD conversion in 14 bits and outputs a 14-bit digital signal.

In this setting, a signal is amplified with analog gain only within the image sensor 400, and 32 times, which corresponds to ISO 3200, is the maximum amplification factor of the analog gain within the image sensor 400. For example, the rate of change per time in a reference signal in an AD converter is changed according to the set ISO sensitivity, whereby a signal can be amplified with analog gain according to the ISO sensitivity when AD conversion is performed.

Next, if the ISO sensitivity is set to ISO 6400, the imaging apparatus 411 sets a second reading mode for the image sensor 400. The imaging apparatus 411 also sets an analog gain of 32 times for the image sensor 400 and sets a digital gain of 2 times for the signal processing circuit 405. In this case, the AD conversion circuit performs AD conversion in 13 bits. The signal processing circuit 405 applies a digital gain of 2 times, thereby outputting a 14-bit digital signal.

Further, if the ISO sensitivity is set to ISO 12800, the imaging apparatus 411 sets the second reading mode for the image sensor 400. The imaging apparatus 411 also sets an analog gain of 32 times for the image sensor 400 and sets a digital gain of 4 times for the signal processing circuit 405. Also in this case, the AD conversion circuit performs AD conversion in 13 bits. The signal processing circuit 405 applies a digital gain of 4 times, thereby outputting a 15-bit digital signal.

Alternatively, a configuration may be employed in which if the ISO sensitivity is set to ISO 12800, the AD conversion circuit performs AD conversion in 12 bits, and the signal processing circuit 405 applies a gain of 4 times, thereby outputting a 14-bit digital signal. In this case, it is possible to further shorten the AD conversion period, and therefore possible to further extend the stabilization time of a dark column influenced by a fluctuation in the potential of a high-luminance column with a high ISO sensitivity. This has the effect of further reducing a lateral band-like offset shift.

Further, the present invention is not limited to a configuration in which the signal processing circuit 405 provided outside the image sensor 400 applies digital gain. Alternatively, a configuration may be employed in which, for example, the data processing circuit 303 within the image sensor 400 applies digital gain to a signal after AD conversion.

Next, a description will be given of the handling of a signal after AD conversion. In the present exemplary embodiment, as described above, between ISO 100 and ISO 3200 for which the first reading mode is set, AD conversion is performed in 14 bits (0 to 16384 counts). With ISO 6400 and ISO 12800 for which the second reading mode is set, AD conversion is performed in 13 bits (0 to 8192 counts).

A case is considered where, for example, the resolution of AD conversion required for the imaging apparatus 411 is 14 bits, and a recommended exposure index (ISO sensitivity) is ISO 6400. If ISO 6400 is set, the amplification factor (the analog gain) until AD conversion is set to 32 times, and the amplification factor (the digital gain) after AD conversion is set to 2 times, thereby applying a gain of 64 times in total.

In a case where the required resolution of AD conversion is 14 bits, and if AD conversion is performed in 0 to 16384 counts equivalent to 14 bits, and a digital gain of 2 times is applied after the AD conversion, this results in 0 to 32768 counts equivalent to 15 bits, and 16385 to 32768 counts are surplus. In response, in the present exemplary embodiment, AD conversion is performed in 0 to 8192 counts equivalent to 13 bits, and a digital gain of 2 times is applied after the AD conversion, whereby it is possible to generate a 14-bit width digital signal corresponding to 0 to 16384 counts.

As described above, in a case where a digital signal after AD conversion is amplified with a digital gain of M times (M is a positive number), then to equalize the bit width of the digital signal, the AD conversion may be performed by applying a gain of 1/M times without changing the rate of change per time in a reference signal. By such control, it is possible to shorten the AD conversion period in the second reading mode.

As another example, the number of bits for AD conversion can be optionally determined. For example, in the first reading mode, AD conversion is performed in 14.1 bits (0 to 17560 counts), and in the second reading mode, AD conversion is performed in 14 bits (0 to 16384 counts).

Next, the details of the first and second reading modes set for the image sensor 400 will be described.

Figure 6:
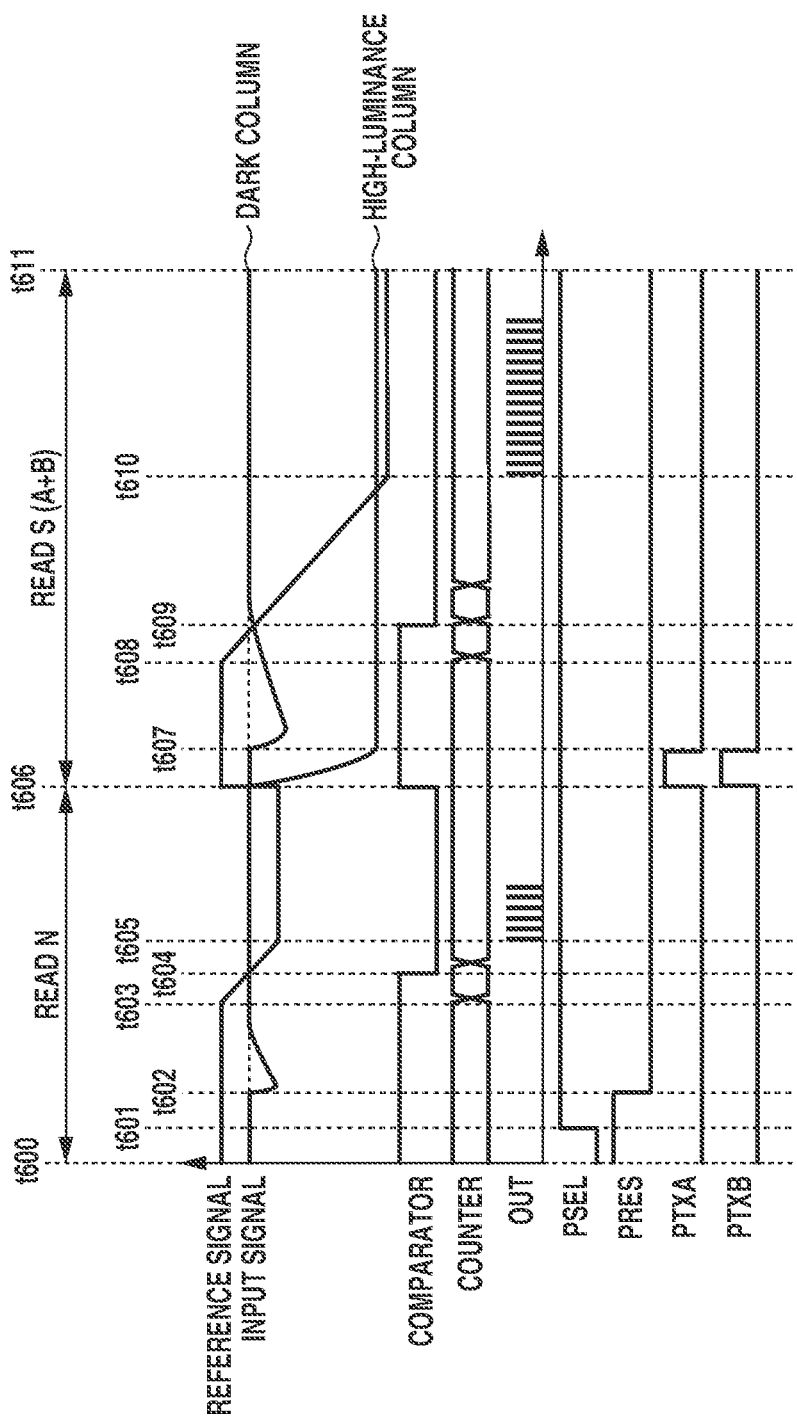
FIG. 6 is a timing chart illustrating a first reading operation according to a first exemplary embodiment.

FIG. 6 is a timing chart of the first reading mode according to the present exemplary embodiment. FIG. 6 illustrates transition of a pixel signal input to a comparator 107 for a pixel column where a high-luminance object is present (a high-luminance column), and transition of a pixel signal input to a comparator 107 for a pixel column where incident light is almost absent (a dark column) Pixels 102 in columns in the same pixel row are similarly driven.

By a time t600, the reset of the pixel portion 101 is completed by setting a reset pulse PRES to high and setting transfer pulses PTXA and PTXB to high. Then, the transfer pulses PTXA and PTXB are set to low in the state where the reset pulse PRES is high, thereby starting the accumulation of charges.

At a time t601, a selection pulse PSEL changes to high, and a pixel 102 in the selected row is connected to the column signal line 105.

At a time t602, the reset pulse PRES changes from high to low, thereby cancelling the reset. A noise component signal (hereinafter referred to as an "N signal") corresponding to a potential according to the amount of charge of the FD 203 at this time is output to the column signal line 105 and input to the comparator 107.

At the time t602, a fluctuation in the potential occurs due to the reset pulse PRES, and this fluctuation is observed as an offset level common to a pixel column in the horizontal direction through a reference potential VDD, ground (GND), and the signal line 103 that are common. This fluctuation converges to a reference level with a certain time constant. In the first reading mode, a fluctuation in an input signal converges by a time t603.

At the time t603, the DAC 111 starts outputting a reference signal VL which changes in a ramp manner. Simultaneously with the start of the output of the ramp signal by the DAC 111, the counter 108 starts counting.

At a time t604, the relative magnitude relationship between the N signal and the reference signal VL input to the comparator 107 reverses, thereby inverting the output of the comparator 107. Then, the count value of the counter 108 at this time is held in the column memory 109.

At a time t605, the reference signal VL transitions until reaching a predetermined value. Then, the horizontal scanning circuit 112 outputs the N signal held in the column memory 109 to outside the image sensor 400.

At a time t606, the comparator 107 is reset. At the time t606, the transfer pulses PTXA and PTXB change to high, thereby transferring photocharges generated in the PDs 201A and 201B to the FD 203. Then, a light component signal (hereinafter referred to as an "A+B signal") that is a potential according to the amount of charge transferred to the FD 203 is output to the column signal line 105 and input to the comparator 107.

At a time t607, the transfer pulses PTXA and PTXB change to low, whereby the transfer of charges from the PDs 201A and 201B to the FD 203 ends.

At a time t608, the DAC 111 starts outputting the reference signal VL which changes in a ramp manner. Simultaneously with the start of the output of the ramp signal by the DAC 111, the counter 108 starts counting.

At a time t609, the relative magnitude relationship between an input signal of the dark column and the reference signal VL input to the comparator 107 reverses, thereby inverting the output of the comparator 107. Then, the count value of the counter 108 at this time is held in the column memory 109. Then, similarly, the relative magnitude relationship between an input signal of the high-luminance column and the reference signal VL input to the comparator 107 reverses, thereby inverting the output of the comparator 107. Then, the value of the counter 108 at this time is held in the column memory 109.

At a time t610, the reference signal VL transitions until reaching a predetermined value. Then, the horizontal scanning circuit 112 outputs the A+B signal held in the column memory 109 to outside the image sensor 400.

Then, the signal processing circuit 405 performs predetermined signal processing such as subtracting the N signal from the A+B signal, thereby removing reset noise.

A fluctuation in the potential due to high-luminance light that occurs in the high-luminance column propagates to a pixel column in the horizontal direction through the reference potential VDD, the GND, and the control signal line 103 that are common. Thus, also in the dark column, this fluctuation is observed as an offset level of a signal superimposed on the potential according to the A+B signal. A fluctuation in the potential that occurs in the dark column converges to a reference level with a certain time constant. In the first reading mode, however, a fluctuation in the potential of the input signal of the dark column that occurs from the time t607 has yet to converge at the time t608 when the output of the reference signal VL by the DAC 111 and the counting by the counter 108 are started.

Figure 7:
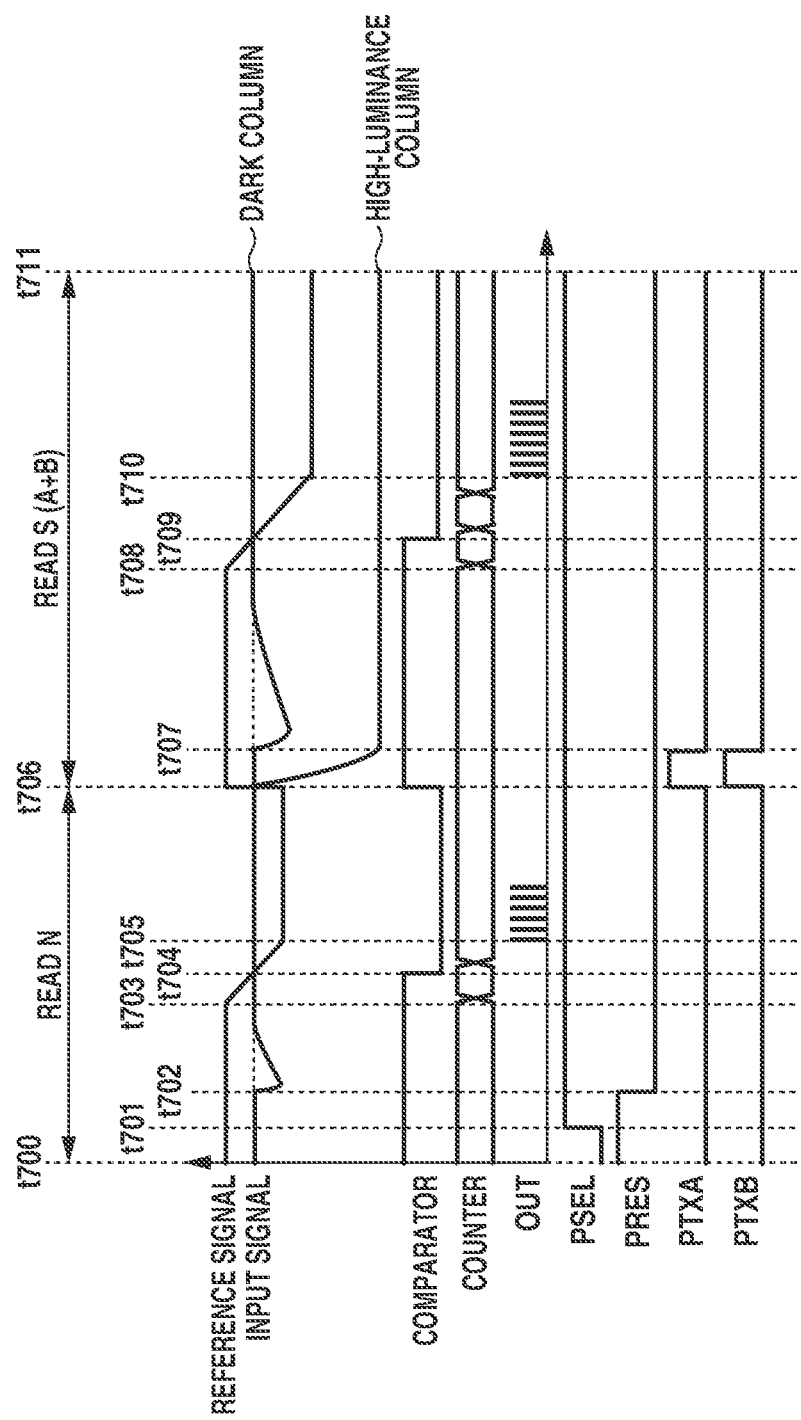
FIG. 7 is a timing chart illustrating a second reading operation according to the first exemplary embodiment.

FIG. 7 is a timing chart of the second reading mode according to the present exemplary embodiment. Operations from a time t700 to the output of the N signal at a time t706 are similar to the operations from the time t600 to the time t606 in the first reading mode described with reference to FIG. 6, and therefore are not described.

At the time t706, the comparator 107 is reset. At the time t706, the transfer pulses PTXA and PTXB change to high, thereby transferring charges of the PDs 201A and 201B to the FD 203. Then, a potential (an A+B signal) according to the amount of charge transferred to the FD 203 is output to the column signal line 105 and input to the comparator 107.

At a time t707, the transfer pulses PTXA and PTXB change to low, whereby the transfer of charges from the PDs 201A and 201B to the FD 203 ends.

At a time t708, the DAC 111 starts outputting the reference signal VL which changes in a ramp manner Simultaneously with the start of the output of the reference signal VL by the DAC 111, the counter 108 starts counting.

At a time t709, the relative magnitude relationship between an input signal of the dark column and the reference signal VL input to the comparator 107 reverses, thereby inverting the output of the comparator 107. Then, the count value of the counter 108 at this time is held in the column memory 109. The relative magnitude relationship between an input signal of the high-luminance column and the reference signal VL input to the comparator 107 does not reverse, and the output of the comparator 107 does not invert. Thus, the maximum count value of the counter 108 is held in the column memory 109.

At a time t710, the reference signal VL transitions until reaching a predetermined value. Then, the horizontal scanning circuit 112 outputs the A+B signal held in the column memory 109 to outside the image sensor 400.

Then, the signal processing circuit 405 performs predetermined signal processing such as subtracting the N signal from the A+B signal, thereby removing reset noise.

Also in the second reading mode, a fluctuation in the potential due to high-luminance light that occurs in the high-luminance column propagates to a pixel column in the horizontal direction through the reference potential VDD, the GND, and the control signal line 103 that are common. Then, also in the dark column, this fluctuation is observed as an offset level of a signal superimposed on the potential according to the A+B signal. A fluctuation in the potential that occurs in the dark column converges to a reference level with a certain time constant. In the second reading mode, a fluctuation in the potential of the input signal of the dark column that occurs from the time t707 converges by the time t708 when the output of the reference signal VL by the DAC 111 and the counting by the counter 108 are started.

The differences between the first and second reading modes will be described below. The period from when the reset pulse PRES or the transfer pulses PTXA and PTXB change to low to when the DAC 111 starts outputting the reference signal VL (the period until the AD conversion circuit starts AD conversion) is defined as a stabilization period of a fluctuation in the potential (a first period). The time from when the output of the reference signal VL is started to when the reference signal VL reaches a predetermined value is defined as an AD conversion period (a second period). The entire period of the series of signal reading operations (a predetermined reading period) is generally termed a horizontal period.

First, the entire period of the first reading mode (from the time t600 to a time t611) and the entire period of the second reading mode (from the time t700 to a time t711) are equal to each other. The first and second reading modes are different from each other in the lengths of the stabilization period (the first period) and the AD conversion period (the second period) of the A+B signal.

That is, the stabilization period of the A+B signal in the second reading mode (from the time t707 to the time t708) is controlled to be longer than the stabilization period of the A+B signal in the first reading mode (from the time t607 to the time t608).

The AD conversion period of the A+B signal in the second reading mode (from the time t708 to the time t710) is controlled to be shorter than the AD conversion period of the A+B signal in the first reading mode (from the time t608 to the time t610).

As described above, in the same horizontal period, the stabilization period of a fluctuation in the potential of the A+B signal is longer in the second reading mode than in the first reading mode, and the AD conversion period of the A+B signal is shorter in the second reading mode than in the first reading mode. This is because, as described above, AD conversion is performed in 14 bits in the first reading mode, whereas AD conversion is performed in 13 bits in the second reading mode.

The rate of change per time in the reference signal VL when AD conversion is performed in each of the first and second reading modes is the same. The rate of change per time in the reference signal VL is appropriately set according to the amplification factor of the analog gain when AD conversion is performed within the image sensor 400 or the resolution of AD conversion.

Next, description will be given of an output signal of the dark column when the signal processing circuit 405 subtracts the N signal from the A+B signal.

In the first reading mode, the N signal is subjected to AD conversion at the original signal level (the time t604), whereas the A+B signal is subjected to AD conversion at a signal level shifted from the original signal level under the influence of a fluctuation in the potential of the high-luminance column (the time t609). If the N signal is subtracted from such an A+B signal, reset noise is removed, but an offset level involved in the fluctuation in the potential cannot be removed. This occurs across columns in the horizontal direction, and therefore, the fluctuation is visually confirmed as a lateral band-like offset shift.

In contrast, in the second reading mode, the stabilization period of the A+B signal is extended, whereby the A+B signal is also subjected to AD conversion at the original signal level without being influenced by a fluctuation in the potential of the high-luminance column (the time t709). Similarly to the first reading mode, the N signal is subjected to AD conversion at the original signal level (the time t704). Then, if the N signal is subtracted from the A+B signal, reset noise is removed, and a lateral band-like offset shift does not occur.

As a variation of the present exemplary embodiment, a configuration may be employed in which an A signal for focus detection is read between the N signal and the A+B signal. Further, it is possible to acquire a B signal for focus detection by subtracting the A signal from the A+B signal.

Regarding an offset shift in a signal level that occurs in the horizontal direction in the same row as that of a high-luminance object in a captured image, the higher the set ISO sensitivity is and the greater the amplification factor of the signal is, the more conspicuous as a lateral band-like color cast in the image the offset shift is.

For example, in a case where the ISO sensitivity is set to ISO 12800, and if the first reading mode is applied, a signal of a dark column influenced by a fluctuation in the potential of a high-luminance column is subjected to AD conversion at the potential before the fluctuation is stabilized. Further, the signal is amplified with a digital gain of 4 times, whereby a lateral band-like offset shift occurs. In contrast, in a case where the ISO sensitivity is set to ISO 12800, and if the second reading mode is applied, a signal of a dark column influenced by a fluctuation in the potential of a high-luminance column is subjected to AD conversion at the potential in which the fluctuation is stabilized. Thus, it is possible to prevent a lateral band-like offset shift.

Generally, the ISO sensitivity is set with respect to each image capturing frame. If the reading period (the horizontal period) of a single line changes according to the ISO sensitivity set with respect to each image capturing frame, it is difficult to control accumulation time in a case where a moving image is captured or still images are continuously captured. In a case where a moving image is captured, the image sensor 400 is driven by rolling shutter. In a case where still images are continuously captured, the image sensor 400 is driven by slit rolling shutter.

With the configuration as illustrated in the present exemplary embodiment, even if the setting of the ISO sensitivity changes with respect to each image capturing frame, the reading period (the horizontal period) does not change. Thus, it is possible to achieve both a change in the ISO sensitivity and a reduction in a lateral band-like offset shift.

As described above, it is possible to provide an imaging apparatus in which a lateral band-like offset shift is reduced without changing a signal reading time (a horizontal period) of the image sensor 400 depending on an image capturing mode.

Figure 8:
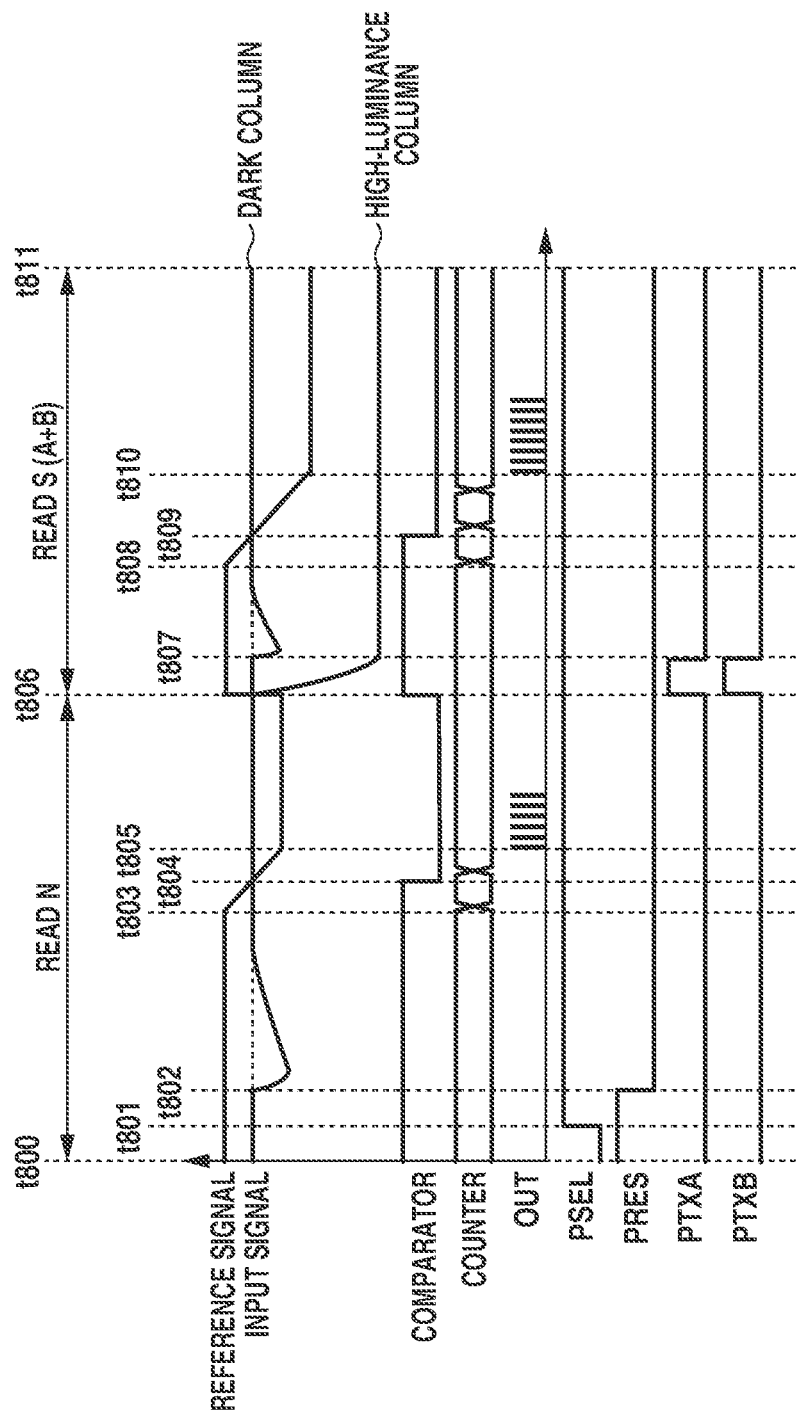
FIG. 8 is a timing chart illustrating a third reading operation according to a second exemplary embodiment.

In a second exemplary embodiment, an example will be described where the image sensor 400 is driven in a third reading mode in addition to the first and second reading modes described in the first exemplary embodiment. FIG. 8 is a timing chart of the third reading mode according to the second exemplary embodiment.

The third reading mode is different from the second reading mode in that control is performed to extend the stabilization period of the N signal instead of extending the stabilization period of the A+B signal. The outline of reading driving is similar to that in the second reading mode. Thus, the present exemplary embodiment will be described focusing on the differences from the first reading mode.

First, the entire period of the third reading mode (from a time t800 to a time t811) is equal to the entire period of the first reading mode (from the time t600 to the time t611). The third and first reading modes are different from each other in the lengths of the stabilization period (the first period) of the N signal and the AD conversion period (the second period) of the A+B signal.

That is, the stabilization period of the N signal in the third reading mode (from the time t802 to the time t803) is controlled to be longer than the stabilization period of the N signal in the first reading mode (from the time t602 to the time t603).

The AD conversion period of the A+B signal in the third reading mode (from the time t808 to the time t810) is controlled to be shorter than the AD conversion period of the A+B signal in the first reading mode (from the time t608 to the time t610).

As described above, in the same horizontal period, the stabilization period of a fluctuation in the potential of the N signal is longer in the third reading mode than in the first reading mode, and the AD conversion period of the A+B signal is shorter in the third reading mode than in the first reading mode.

A lateral band-like offset shift can also occur due to a fluctuation in the potential of the N signal. As in the present exemplary embodiment, time obtained by shortening the AD conversion period of the A+B signal is allotted to the stabilization period of a fluctuation in the potential of the N signal, whereby it is possible to reduce a lateral band-like offset shift.

As described above, it is possible to provide an imaging apparatus in which a lateral band-like offset shift due to a fluctuation in the potential of an N signal is reduced without changing a reading time (a horizontal period) of the image sensor 400 depending on an image capturing mode.

Figure 9:
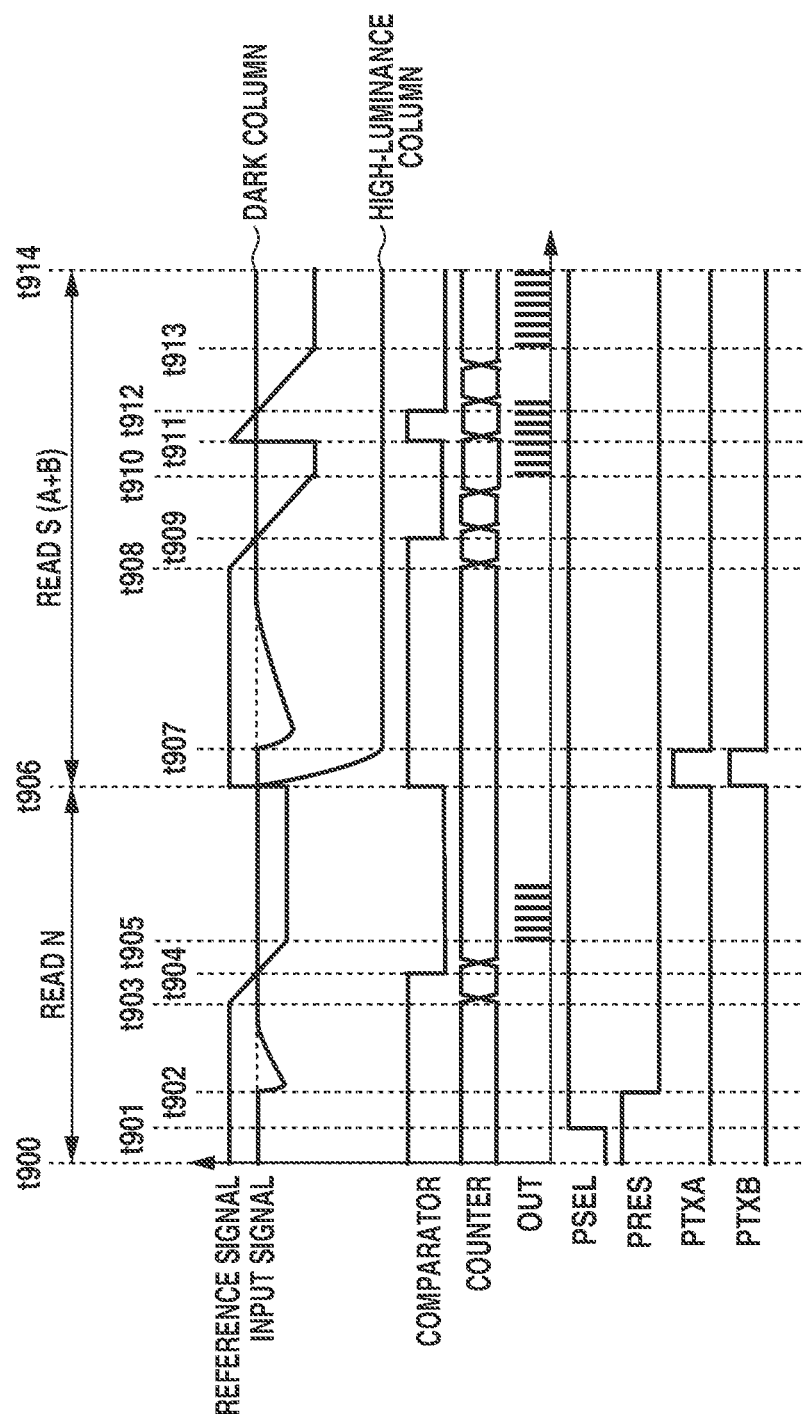
FIG. 9 is a timing chart illustrating a fourth reading operation according to a third exemplary embodiment.

In a third exemplary embodiment, an example will be described where the image sensor 400 is driven in a fourth reading mode in addition to the first and second reading modes described in the first exemplary embodiment and the third reading mode described in the second exemplary embodiment. FIG. 9 is a timing chart of the fourth reading mode according to the third exemplary embodiment.

The fourth reading mode is different from the second reading mode in that AD conversion is performed on the same A+B signal twice.

Operations from a time t900 to a time t910 are similar to the operations from the time t700 to the time t710 in the second reading mode described with reference to FIG. 7, and therefore will not be described.

At a time t911, the reference signal VL is reset, and the DAC 111 starts outputting the reference signal VL which changes in a ramp manner again. Simultaneously with the start of the output of the reference signal VL by the DAC 111, the comparator 107 is reset and the counter 108 starts counting.

At a time t912, the relative magnitude relationship between the input signal of the dark column and the reference signal VL input to the comparator 107 reverses, thereby inverting the output of the comparator 107. Then, the count value of the counter 108 at this time is held in the column memory 109. The relative magnitude relationship between the input signal of the high-luminance column and the reference signal VL input to the comparator 107 does not reverse, and the output of the comparator 107 does not invert. Thus, the maximum value of the counter 108 is held in the column memory 109.

At a time t913, the reference signal VL transitions until reaching the predetermined value. Then, the horizontal scanning circuit 112 outputs the A+B signal held for the second time in the column memory 109 to outside the image sensor 400. Then, the output A+B signals obtained by performing AD conversion twice are subjected to an averaging process by the signal processing circuit 405. Alternatively, the A+B signals may be subjected to an averaging process by the data processing circuit 303 before being output to outside the image sensor 400.

The differences between the fourth and first reading modes are described below.

First, the entire period of the fourth reading mode (from the time t900 to a time t914) is equal to the entire period of the first reading mode (from the time t600 to the time t611). The fourth and first reading modes are different from each other in the lengths of the stabilization period (the first period) of the A+B signal and the AD conversion period (the second period) of the A+B signal.

That is, the stabilization period of the A+B signal in the fourth reading mode (from the time t907 to the time t908) is controlled to be longer than the stabilization period of the A+B signal in the first reading mode (from the time t607 to the time t608).

Each of the AD conversion periods of the A+B signal in the fourth reading mode (from the time t908 to the time t910 and from the time t911 to the time t913) is controlled to be shorter than the AD conversion period of the A+B signal in the first reading mode (from the time t608 to the time t610).

As described above, in the same horizontal period, the stabilization period of a fluctuation in the potential of the A+B signal is longer in the fourth reading mode than in the first reading mode, and the AD conversion period of the A+B signal is shorter in the fourth reading mode than in the first reading mode. Further, in the fourth reading mode, AD conversion is performed on the A+B signal multiple times.

Generally, if the stabilization period of a fluctuation in the potential becomes long, random noise (1/f noise) increases. In the present exemplary embodiment, in view of this situation, AD conversion is performed on the same signal multiple times, whereby it is possible to reduce random noise that increases with the prolongation of the stabilization period. In the fourth reading mode, the stabilization period of the A+B pixel signal is extended, but may be the same length as that in the first reading mode.

As described above, it is possible to provide an imaging apparatus in which a lateral band-like offset shift is reduced without changing the length of a signal reading time (a horizontal period) of the image sensor 400 depending on an image capturing mode, and a control method for controlling an imaging apparatus.

Figure 10:
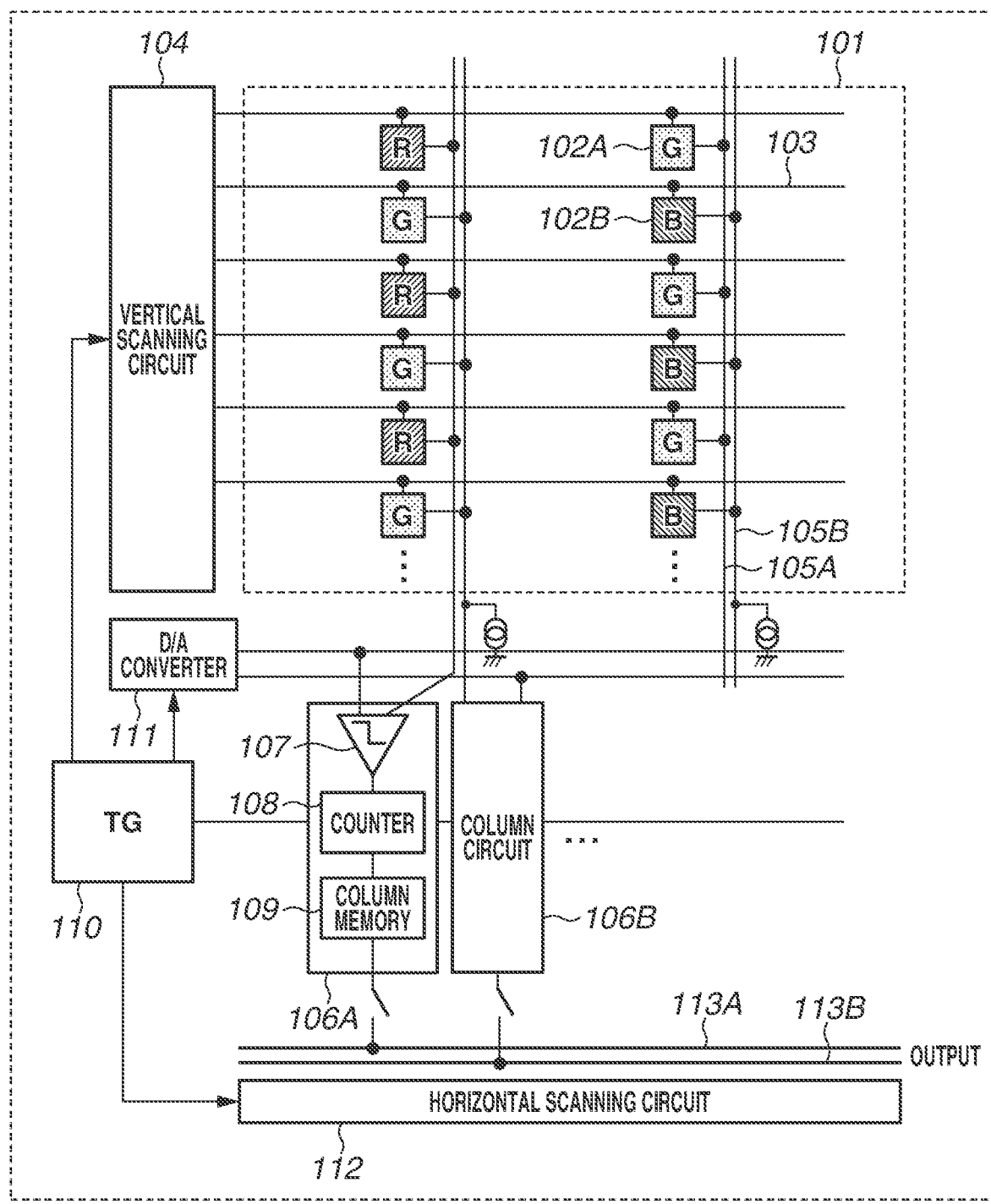
FIG. 10 is a block diagram illustrating an example of a configuration of pixels and peripheral circuits of an image sensor according to a fourth the exemplary embodiment.

In a fourth exemplary embodiment, a description will be given of a variation of the configuration of the pixels and the peripheral circuits of the image sensor 400. FIG. 10 is a block diagram illustrating an example of the configuration of pixels and peripheral circuits of an image sensor 400 according to the fourth exemplary embodiment. FIG. 10 is different from FIG. 1 in that a configuration is employed in which a plurality of reference signals generated by the DAC 111 is each output through an individual wire and input to one of the comparator 107 of the column circuit 106A or 106B. With such a configuration, it is possible to supply a reference signal at a different timing with respect to each column circuit (with respect to each column of the pixel array 101).

Figure 11:
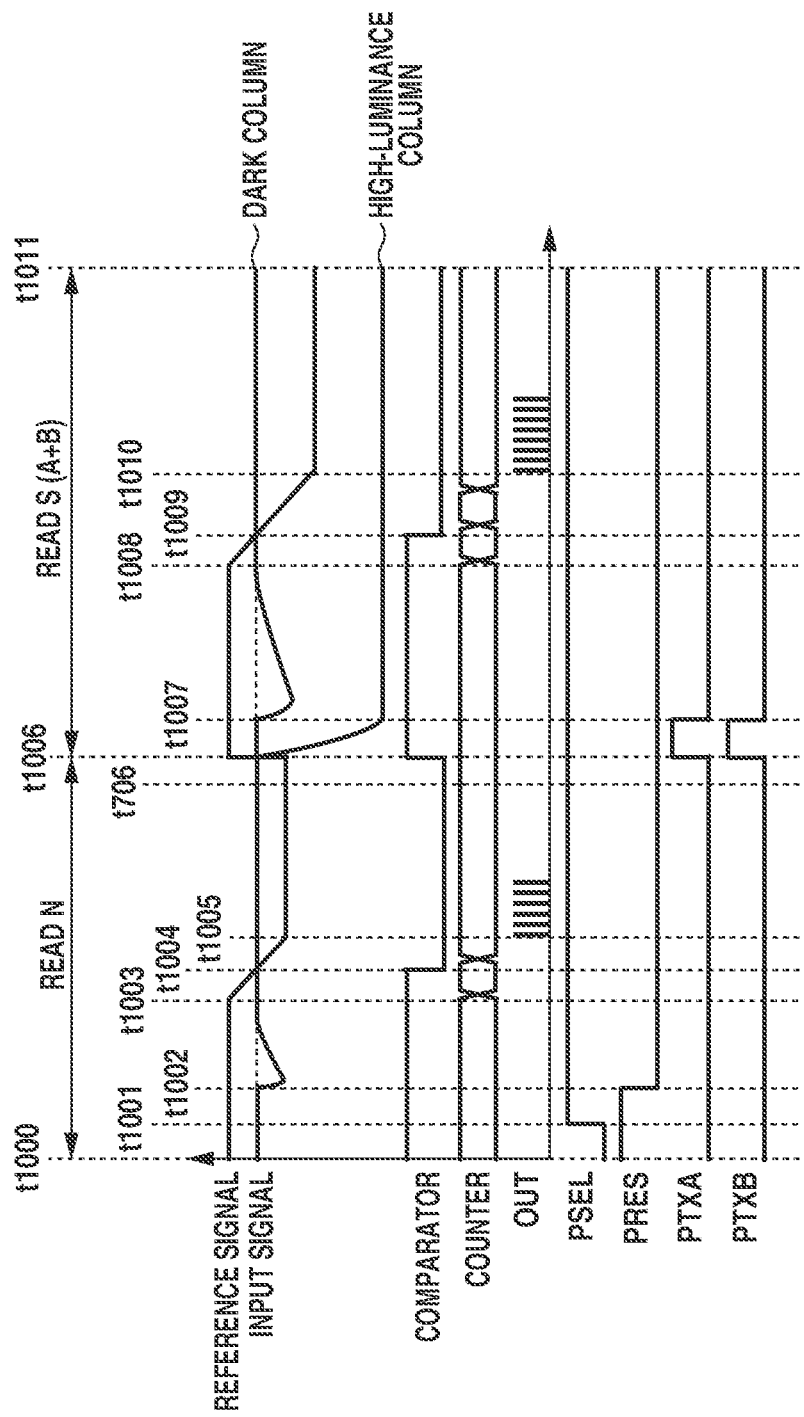
FIG. 11 is a timing chart illustrating a fifth reading operation according to the fourth exemplary embodiment.

FIG. 11 is a timing chart of a fifth reading mode according to the fourth exemplary embodiment. The outline of reading driving is similar to that in the second reading mode. Thus, the present exemplary embodiment will be described focusing on the differences from the second reading mode.

First, the entire period of the fifth reading mode (from a time t1000 to a time t1011) is equal to the entire period of the second reading mode (from the time t700 to the time t711). The fifth and second reading modes are different from each other in the timing when the transfer pulses PTXA and PTXB change to high.

That is, the timing when the transfer pulses PTXA and PTXB change to high in the fifth reading mode (the time t1006) is controlled to be later than the timing when the transfer pulses PTXA and PTXB change to high in the second reading mode (the time t706).

Then, the stabilization period of the A+B signal in the fifth reading mode (from the time t1007 to the time t1008) is shorter than the stabilization period of the A+B signal in the second reading mode (from the time t707 to the time t708).

As described above, in the same horizontal period, the fifth reading mode is different from the second reading mode in the timing when the transfer pulses PTXA and PTXB change to high, and the stabilization period of a fluctuation in the potential of the A+B signal is shorter in the fifth reading mode than in the second reading mode.

In the fourth exemplary embodiment, the column circuit 106A is controlled to read a signal in the second reading mode, and the column circuit 106B is controlled to read a signal in the fifth reading mode. That is, in the fourth exemplary embodiment, the reading timing of a signal is varied with respect to each of adjacent column circuits (with respect to each column of the pixel array 101).

The degree of a lateral band-like offset shift also differs depending on the size of fluctuations in the potentials that simultaneously occur. In the present exemplary embodiment, fluctuations in the potentials that simultaneously occur are dispersed into the column circuits 106A and 106B, whereby it is possible to reduce a lateral band-like offset shift.

Alternatively, a configuration may be employed in which the column circuit 106A reads a signal in the first reading mode, and the column circuit 106B reads a signal in the fifth reading mode.

In another form, the reading timing of a signal may be not only determined according to adjacent column circuits, but also optionally determined according to the arrangement of column circuits. For example, a configuration may be employed in which the reading timing of a signal to be applied is varied with respect to each partial position or region such as the left side, the right side, the upper side, or the lower side relative to the center of the image sensor 400.

As described above, it is possible to provide an imaging apparatus in which a lateral band-like offset shift is reduced without changing a reading time (a horizontal period) of the image sensor 400 according to an image capturing mode.

While exemplary embodiments of the present invention have been described above, the present invention is not limited to these exemplary embodiments, and can be modified and changed in various ways within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-065655, filed Apr. 8, 2021, which is hereby incorporated by reference herein in its entirety.

What is claimed is:

1. An imaging apparatus comprising:
a pixel array in which a plurality of pixels is arranged in a matrix;
a plurality of column signal lines to which signals of the plurality of pixels are output with respect to each column of the pixel array;
a plurality of analog-to-digital (AD) conversion circuits configured to perform AD conversion on the signals from the plurality of pixels output to the plurality of column signal lines with respect to each column;
an amplification circuit configured to amplify, with digital gain, digital signals obtained by the plurality of AD conversion circuits performing the AD conversion; and
a control unit configured to perform control to output signals of pixels placed in a same row of the pixel array among the plurality of pixels to the plurality of column signal lines with respect to each column and cause the plurality of AD conversion circuits to perform signal AD conversion during a predetermined reading period, and to perform control to, in a case where the amplification circuit does not amplify the digital signals, read the signals of the plurality of pixels in a first signal reading mode, and in a case where the amplification circuit amplifies the digital signals, read the signals of the plurality of pixels in a second signal reading mode,
wherein the predetermined reading period includes a first period from when the signals of the plurality of pixels are output to the plurality of column signal lines with respect to each column and the plurality of AD conversion circuits starts signal AD conversion, and a second period when the plurality of AD conversion circuits performs the signal AD conversion from the plurality of pixels output to the plurality of column signal lines with respect to each column, and
wherein the predetermined reading period is equal between the first and second signal reading modes, the first period in the second signal reading mode is longer than the first period in the first signal reading mode, and the second period in the second signal reading mode is shorter than the second period in the first signal reading mode.

2. The imaging apparatus according to claim 1, wherein the plurality of AD conversion circuits includes slope AD conversion circuits configured to perform AD conversion on the signals of the plurality of pixels using a reference signal a level of which changes with a lapse of time.

3. The imaging apparatus according to claim 2, wherein a rate of change per time in the reference signal is the same between the first and second signal reading modes.

4. The imaging apparatus according to claim 1, wherein in the second signal reading mode, the plurality of AD conversion circuits performs AD conversion on the same signal a plurality of times.

5. The imaging apparatus according to claim 1, wherein the first and second signal reading modes are assigned with respect to each column of the pixel array.

* * * * *